Feb. 9, 1971   HANS-WERNER KÄMPFER ET AL   3,562,021
HEATING DEVICE FOR AT LEAST ONE THERMOELECTRIC BATTERY
ADAPTED TO FURNISH CURRENT FOR A LIMITED TIME PERIOD
Filed July 3, 1968
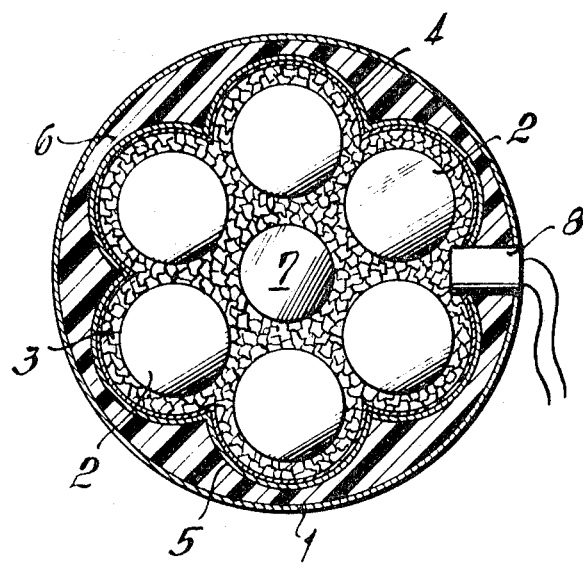
INVENTORS
Hans-Werner KÄMPFER
Klaus BIELF
Rudolf SCHLOSSER

United States Patent Office 3,562,021
Patented Feb. 9, 1971

3,562,021
HEATING DEVICE FOR AT LEAST ONE THERMO-ELECTRIC BATTERY ADAPTED TO FURNISH CURRENT FOR A LIMITED TIME PERIOD
Hans-Werner Kämpfer, Rothenbach, Pegnitz, Klaus Biele, Lauf-Kotzenhof, and Rudolf Schlosser, Ruckersdorf, Germany, assignors to DIEHL, Nuremberg, Germany
Filed July 3, 1968, Ser. No. 742,299
Claims priority, application Germany, July 4, 1967,
P 15 39 283.3
Int. Cl. H01v 1/00
U.S. Cl. 136—205
10 Claims

ABSTRACT OF THE DISCLOSURE

Heating device for at least one thermoelectric battery adapted to supply current for a limited period of time which comprises an oxidator, a rapidly combustible heating component surrounding said oxidator, said heating component containing a reducing agent, a melting substance surrounding said heating component and a non-melting layer separating said heating component from said melting substance, and which also comprises means for igniting said heating component.

---

The present invention is based on a heretofore known heating device for at least one thermoelectric battery which is adapted to furnish current for a limited period and is provided with a rapidly combustible heating component which contains a reducing agent, a melting substance melting with the burning up of the heating component, said melting substance having a melting point of about the same temperature as the operating temperature of the thermoelectric battery, and with a mechanical or electrical igniting device for igniting the heating component.

Thermoelectric batteries of this type serve as a source of energy for regulating or controlling devices in unmanned flying bodies in which the source of energy need be effective for a limited time period only. In this connection it is important that the battery within a short period of from about 0.5 to 1.0 second is in operating condition and reaches its full terminal voltage. This terminal voltage should then be available for at least one to two minutes.

This known arrangement is so designed that a plurality of rod-shaped batteries are arranged in a container or cup adjacent to each other and in a circular manner while a heating component is poured between the batteries in such a way that each battery is surrounded by the heating component. The heating component, in turn, is separated from the wall of said container and a central bore in the center of said container by a melting substance and an insulating substance. In order to prevent the melting substance and the heating component from running together after the heating component has burned off, both said melting substance and said insulating substance are separated from each other by a metallic layer provided therebetween. By means of an igniting device, the heating component is ignited at a reference time and burns up rapidly. While this occurs the batteries are heated up to a temperature of approximately 650° C. Simultaneously, the melting substance melts and after burning and cooling of the heating substance gives up its heat of fusion to the heating component so that the heating component will cool down at a slower rate than it would otherwise without the employment of a melting substance. In this way the batteries are kept at such a high temperature that the terminal voltage remains practically constant for a time period of from one to two minutes.

It is an object of the present invention to provide a heating device of the above mentioned type which will keep the terminal voltage of the thermo-batteries constant over a longer period of time, namely, for at least two and one-half minutes.

It is another object of this invention to provide a device as set forth in the preceding paragraph which is simple in construction and reliable in operation These and other objects and advantages of the invention will appear more clearly from the following specification in connection with the accompanying drawing illustrating a horizontal section of a heating device according to the invention.

The above outlined objects have been realized by the present invention which is characterized in that an oxidizing agent is provided in the immediate vicinity of the heating component which oxidizing agent, following the heating of the battery to a predetermined temperature, will oxidize the reducing agent which is not used up during the combustion of the heating component and is available in excess whereby the cooling of the heating component is slowed down. In view of the said oxidizing agent, approximately ten seconds after the ignition of the heating component there is effected an oxidation of the reducing agent which is excessive in the heating component and has not yet been burned. As a result thereof heat energy becomes free which considerably slows down the cooling of the heating component.

As reducing agent, preferably silicon is employed in conformity with the present invention, but it is also possible instead to use aluminum, boron or zirconium.

It has also been found that particularly favorable conditions are obtained when the reducing agent in the heating component amounts to approximately 25% by weight. As oxidator there is employed according to the invention a binary system which comprises barium peroxide $BaO_2$ and vanadium pentoxide $V_2O_5$. Fundamentally, however, it is also possible to employ another oxidator which when heated up will give off oxygen.

According to a further development of the present invention, it is suggested so to arrange the oxidator that it is spacially separated from the battery by the heating component.

Referring now to the drawing in detail, six rod-shaped thermoelectric batteries 2 are arranged in a cylindrical cup 1. These batteries are surrounded by a heating component 3 which is surrounded by a metallic layer 4 separating the heating component from a melting substance 5 having a high heat of fusion. The melting substance is separated from the wall of the cup by an insulating layer 6. Within the cylindrical chamber formed by the heating component there is in conformity with the present invention arranged the oxidator 7. This oxidator 7 consists of a binary system of bariumperoxide and vanadium pentoxide. For igniting the heating component, there is provided an igniting device 8. After the ignition of the heating component has been effected by the igniting device, the following events take place in the heating system. The heating component burns and within the time period of from 0.5 to 1 second heats up the thermo-batteries to a temperature of 650° C. As a result thereof, 5% by weight of the 25% by weight of silicon in the heating component are oxidized. Simultaneously the melting substance 5 begins to melt. During the heating process, namely when the heating component exceeds the temperature of about 320° C., the elements of the oxidator begin to react chemically according to the formula:

$$BaO_2 + V_2O_5 \rightarrow Ba(VO_3)_2 + \tfrac{1}{2} O_2$$

The oxygen thus freed combines with the as yet unused silicon of the heating component to form silicon dioxide $SiO_2$ while thermal energy is released which retards the

now starting cooling of the heating component. Consequently, also the natural cooling of the heating component is held at a minimum over a period of 2½ minutes by the heat of fusion of the melting substance and by the heat generated indirectly by the oxidator. The terminal voltage of the batteries remains constant. Only when the reduction of free silicon to silicon dioxide has become substantially complete, does the cooling of the heating component progress rapidly and the terminal voltage of the thermoelectric batteries begins to subside.

It is, of course, to be understood that the present invention is, by no means, limited to the particular arrangement shown in the drawing but that the scope of the invention is determined by the appended claims.

What we claim is:

1. In combination with at least one thermoelectric battery adapted to furnish current for a limited time period, a heating device which comprises: an oxidator, a rapidly combustible heating component surrounding said oxidator; said heating component containing a reducing agent, a melting substance surrounding said heating component and a non-melting layer separating said heating component from said melting substance; and igniting means for igniting said heating component.

2. A heating device according to claim 1, in which said igniting means is adapted to be activated mechanically.

3. A heating device according to claim 1, in which said igniting device is adapted to be activated electrically.

4. A heating device according to claim 1, in which said melting substance has a melting point within the range of temperatures required for burning said heating component.

5. A heating device according to claim 1, in which said melting substance has a melting point corresponding to the operating temperature of said thermoelectric battery.

6. A heating device according to claim 1, in which said oxidator is located in the immediate vicinity of the heating component.

7. A heating device according to claim 1, in which said oxidator comprises barium peroxide and vanadium pentoxide.

8. A heating device according to claim 1, in which said reducing agent comprises silicon.

9. A heating device according to claim 1, in which said reducing agent amounts to 25% by weight of the heating component.

10. A heating device according to claim 1, in which said oxidator is separated from said battery by the heating component.

References Cited

FOREIGN PATENTS 1,212,606    3/1966    Germany _____ 136—205

CARL D. QUARFORTH, Primary Examiner

H. E. BEHREND, Assistant Examiner

U.S. Cl. X.R.

136—90, 230